(12) United States Patent
Iwamoto et al.

(10) Patent No.: US 9,188,810 B2
(45) Date of Patent: Nov. 17, 2015

(54) LIQUID CRYSTAL DISPLAY

(75) Inventors: Yoshihisa Iwamoto, Tokyo (JP); Hiroto Fukushima, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 244 days.

(21) Appl. No.: 13/160,765

(22) Filed: Jun. 15, 2011

(65) Prior Publication Data
US 2011/0304802 A1 Dec. 15, 2011

(30) Foreign Application Priority Data

Jun. 15, 2010 (JP) ................. 2010-135912

(51) Int. Cl.
*G02F 1/1337* (2006.01)
(52) U.S. Cl.
CPC .......... *G02F 1/133707* (2013.01); *G02F 2001/133742* (2013.01)
(58) Field of Classification Search
CPC .......... G02F 1/133707; G02F 2001/133742; G02F 2001/133746
USPC .................................. 349/129, 141
See application file for complete search history.

(56) References Cited

U.S. PATENT DOCUMENTS

| 6,816,223 | B2 | 11/2004 | Sugiyama et al. | |
| 7,072,017 | B1 * | 7/2006 | Yoo et al. | 349/129 |
| 2004/0165136 | A1 * | 8/2004 | Sugiyama et al. | 349/143 |
| 2009/0207356 | A1 * | 8/2009 | Kim et al. | 349/123 |

FOREIGN PATENT DOCUMENTS

| CN | 1523399 A | 8/2004 |
| JP | 11-095224 A | 4/1999 |
| JP | 2003-029282 A | 1/2003 |
| JP | 2004-252298 A | 9/2004 |
| JP | 2004-341049 A | 12/2004 |
| JP | 2005-234254 A | 9/2005 |
| JP | 2006-113209 A | 4/2006 |

(Continued)

OTHER PUBLICATIONS

Japanese Office Action dated Jan. 10, 2013 issued in counterpart Japanese Application No. 2010-135912.

(Continued)

*Primary Examiner* — Jessica M Merlin
(74) *Attorney, Agent, or Firm* — Holtz, Holtz, Goodman & Chick PC

(57) ABSTRACT

A liquid crystal display includes a first substrate including a first electrode, a second substrate including a second electrode, and a liquid crystal layer provided between the first substrate and the second substrate which is controlled to a substantially vertical orientation having a pretilt angle smaller than 90 degrees. The first electrode includes a plurality of rectangular openings extending in a direction substantially perpendicular to the orientation direction of liquid crystal molecules at substantially a center of the liquid crystal layer. A plurality of first areas and a plurality of second areas disposed mutually alternately are set in an effective display area in which the first electrode and the second electrode overlap in a planar view. Relative positions of the openings are mutually unmatched relative to at least a part of the plurality of second areas, and the openings are not formed in the plurality of first areas.

15 Claims, 5 Drawing Sheets

(56) References Cited

FOREIGN PATENT DOCUMENTS

| | | | |
|---|---|---|---|
| JP | 4107978 | B2 | 6/2008 |
| JP | 4373126 | B2 | 11/2009 |

OTHER PUBLICATIONS

Chinese Office Action dated Oct. 30, 2014 issued in Chinese Application No. 201110154367.5.

* cited by examiner

Fig. 1
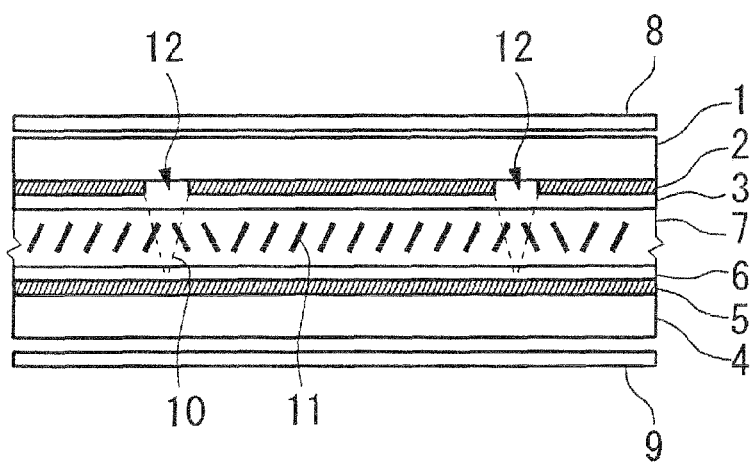
Fig. 2
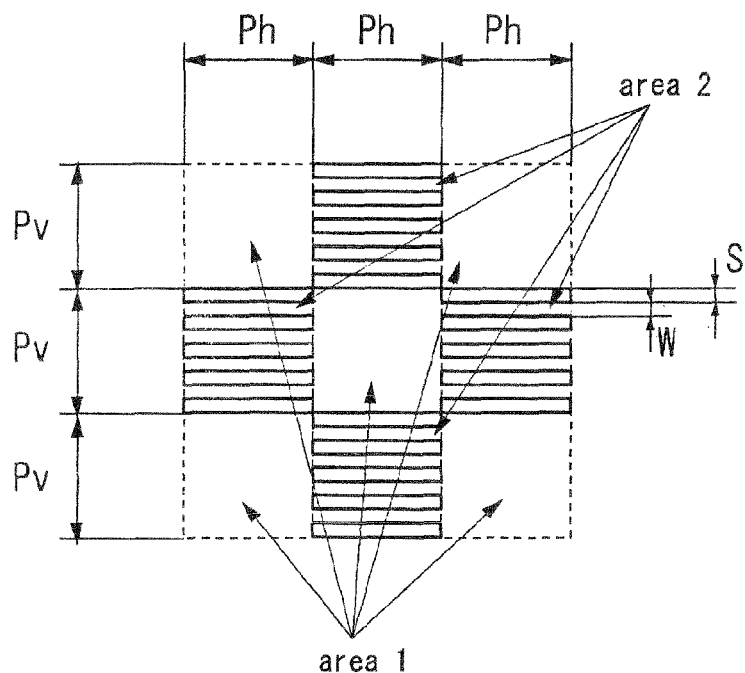
Fig. 3
| structure | Ph | Pv | S | W |
|---|---|---|---|---|
| 1 | 0.05 | 0.05 | 0.007 | 0.014 |
| 2 | 0.1 | 0.1 | 0.007 | 0.014 |
| 3 | 0.15 | 0.15 | 0.007 | 0.014 |

| structure | pretilt angle | transmissivity during frontal viewing % | maximum transmissivity of the optimal viewing direction % | minimum transmissivity of the anti-viewing direction % |
|---|---|---|---|---|
| 1 | approx. 89.9 deg. | 3.56 | 6.58 | 3.229 |
| 1 | approx. 89.7 deg. | 3.68 | 7.69 | 2.564 |
| 1 | approx. 89 deg. | 3.81 | 8.37 | 1.475 |
| 2 | approx. 89 deg. | 4.91 | 10.37 | 1.359 |
| 3 | approx. 89 deg. | 6.03 | 12.22 | 1.328 |
| conventional structure | approx. 89 deg. | 11.79 | 22.24 | 0.045 |

| structure | Ph | Pv | S | W |
|---|---|---|---|---|
| 4 | 0.08 | 0.057 | 0.007 | 0.0285 |
| 5 | 0.08 | 0.107 | 0.007 | 0.0535 |
| 6 | 0.08 | 0.157 | 0.007 | 0.0785 |

| structure | transmissivity during frontal viewing % | maximum transmissivity of the optimal viewing direction % | minimum transmissivity of the anti-viewing direction % |
|---|---|---|---|
| 4 | 8.73 | 16.47 | 1.316 |
| 5 | 9.95 | 19.52 | 0.730 |
| 6 | 10.49 | 20.18 | 0.455 | ns
LIQUID CRYSTAL DISPLAY

BACKGROUND OF THE INVENTION

1. Field of the Invention

The present invention relates to a liquid crystal display with a plurality of openings (slits) formed on an electrode.

2. Description of the Background Art

As an information display device, a display device with extremely low display brightness of the background display area or the dark display area is demanded, and a vertical alignment liquid crystal display is known as a display device capable of realizing the same. A vertical alignment liquid crystal display is able to achieve extremely low transmissivity in the initial oriented state since the optical characteristics during the frontal viewing in the initial oriented state are approximately equal to the optical characteristics of crossed nicol polarizers.

When liquid crystal molecules of a liquid crystal layer are oriented unidirectionally in a vertical alignment liquid crystal display; that is, when mono-domain alignment is adopted, there is an optimal viewing direction capable of obtaining the optimal contrast in which the bright display state can be viewed the brightest depending on the viewer's viewing direction when voltage is applied to the liquid crystal layer to achieve a bright display state. Moreover, there is also an anti-viewing direction in which the bright display state becomes equal to or less than the transmissivity in the non-voltage-applied area (background area) or the dark display; that is, a direction where display inversion is observed. With this kind of display state, it may become a display state that is completely different from the display state that is recognized during frontal viewing, or the display itself may become a state that is unrecognizable from its appearance.

Meanwhile, in order to obtain favorable viewing-angle characteristics even during voltage application, it is effective to divide the orientation direction of the liquid crystal molecules into a plurality of directions in one pixel (multi-domain orientation), and various types of technologies have been proposed for realizing the same. For example, Japanese Patent No. 4107978 (Patent Document 1) discloses technology (fringe electric field orientation control method) of generating fringe electric field s in two directions that differ by 180 degrees within the liquid crystal layer and controlling the orientation toward such directions by devising the electrode shape in a segment display-type liquid crystal display.

With the liquid crystal display of the foregoing conventional example, the upper and lower electrodes placed opposite each other need to be respectively provided with substantially rectangular openings, and the upper and lower electrodes need to be arranged so that the openings of the upper electrode and the openings of the lower electrode are alternately aligned in a planar view. Nevertheless, in order to realize the orientation stability of the liquid crystal layer in the liquid crystal display of the foregoing conventional example, since it is necessary to dispose the openings in cycles of approximately several tens of micrometers, there is a drawback in that high precision is required for the positioning of the upper and lower electrodes. Moreover, the aperture ratio of the display part will drop since numerous openings are provided, and there is concern that the transmissivity will drop during the bright display state.

In response to the foregoing problems, realization of the multi-domain alignment based on technology such as the photo alignment treatment method (for instance, refer to Japanese Patent No. 4373126) combined with mask exposure may be considered. Nevertheless, if these technologies are used, there is a drawback in that the alignment treatment will become complicated and prolong the processing time.

A specific mode of this invention aims to improve the display quality in a liquid crystal display.

SUMMARY OF THE INVENTION

The liquid crystal display according to an aspect of the present invention comprises (a) a first substrate including a first electrode on one plane, (b) a second substrate including a second electrode on one plane, and (c) a liquid crystal layer provided between the first substrate and the second substrate and which is controlled to a substantially vertical orientation having a pretilt angle that is smaller than 90 degrees. The first electrode includes a plurality of rectangular openings extending in a direction that is substantially perpendicular to the orientation direction of liquid crystal molecules at substantially the center of the liquid crystal layer. And a plurality of first areas and a plurality of second areas disposed mutually alternately are set in an effective display area in which the first electrode and the second electrode overlap in a planar view. Moreover, the relative positions of the openings are mutually unmatched relative to at least a part of the plurality of second areas, and the openings are not formed in the plurality of first areas.

According to the liquid crystal display of the above-described invention, it is possible to increase the minimum transmissivity in the anti-viewing direction, and improve the viewing angle characteristics during the bright display state in the anti-viewing direction. Accordingly, the display state can now be recognized even in an orientation where the display visibility was inferior in the conventional display, and the display quality of the liquid crystal display can thereby be improved.

According to the liquid crystal display of the above-described invention, two or more of the openings may be formed in each of the plurality of second areas.

Moreover, according to the liquid crystal display of the above-described invention, the pretilt angle is preferably 89.5 degrees or less and 88 degrees or more.

The liquid crystal display of the above-described invention may further comprise a first polarizer disposed outward of the first substrate and a second polarizer disposed outward of the second substrate. In this case, the first polarizer and the second polarizer are disposed so that their respective absorption axes become substantially orthogonal, and the respective absorption axes and the orientation direction of the liquid crystal molecules at substantially the center of the liquid crystal layer form an angle of approximately 45 degrees.

BRIEF DESCRIPTION OF THE DRAWINGS

FIG. 1 is a partial cross section of the liquid crystal display according to one embodiment of the liquid crystal display.

FIG. 2 is a schematic plan view showing the structure of the respective openings provided to the upper electrode.

FIG. 3 is a diagram showing an example of the setting values of the respective parameters such as the width Ph and the height Pv of the respective areas, and the short-side length S and the edge interval W of the respective openings.

DESCRIPTION OF THE PREFERRED EMBODIMENTS

Figure 4A:
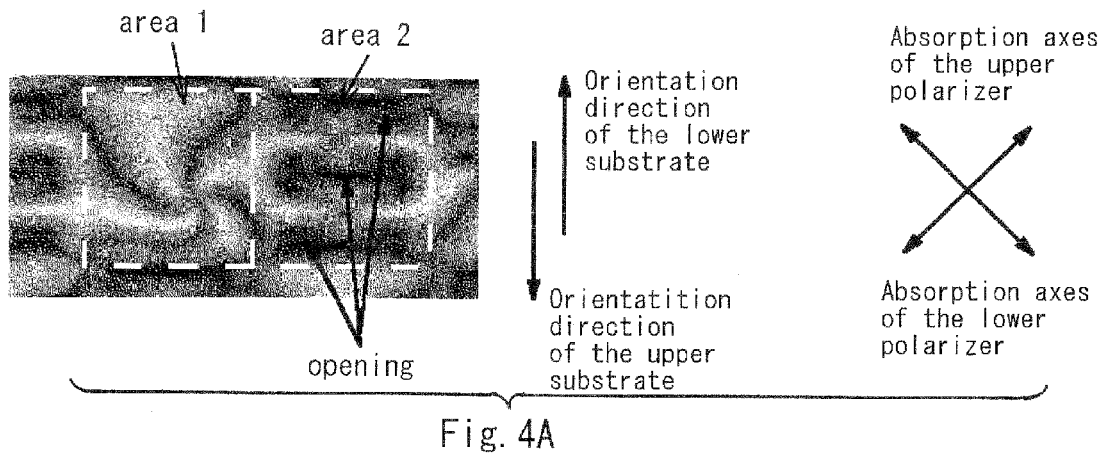
FIGS. 4A to 4C are diagrams showing the orientation texture observed image when the pretilt angle provided by the respective alignment films was set to approximately 89.9 degrees, approximately 89.7 degrees and approximately 89 degrees in the liquid crystal display of the structure 1.

Embodiments of the present invention are now explained with reference to the appended drawings.

FIG. 1 is a partial cross section of the liquid crystal display according to one embodiment. The liquid crystal display of the embodiment shown in FIG. 1 is configured by including an upper substrate (first substrate) 1, an upper electrode (first electrode) 2, an alignment film 3, a lower substrate (second substrate) 4, a lower electrode (second electrode) 5, an alignment film 6, a liquid crystal layer 7, an upper polarizer (first polarizer) 8, and a lower polarizer (second polarizer) 9. The liquid crystal display of this embodiment is, for example, a segment-type liquid crystal display, a dot matrix-type liquid crystal display, or a mixed type liquid crystal display of the segment type and the dot matrix type, and is driven by multiplex driving.

The upper substrate 1 and the lower substrate 4 are respectively transparent substrates such as a glass substrate, a plastic substrate or the like. Spacers (granular materials) are dispersed and arranged mutually between the upper substrate 1 and the lower substrate 4. As a result of these spacers, a gap between the upper substrate 1 and the lower substrate 4 is maintained at a predetermined distance (for example, approximately 3.8 micrometers).

The upper electrode 2 is provided on one plane of the upper substrate 1. Similarly, the lower electrode 5 is provided on one plane of the lower substrate 4. The upper electrode 2 and the lower electrode 5 are respectively configured, for example, by patterning a transparent conductive film made of indium tin oxide (ITO) or the like as needed. The upper electrode 2 has a plurality of openings (slits) 12 with a shape extending in one direction. The respective openings 12 are formed by partially removing the upper electrode 2. Details regarding the opening 12 will be described later.

The alignment film 3 is provided on one side of the upper substrate 1 so as to cover the upper electrode 2. Similarly, the alignment film 6 is provided on one side of the lower substrate 4 so as to cover the lower electrode 5. In this embodiment, as the alignment film 3 and the alignment film 6, used is a film (vertically alignment film) which regulates the oriented state of the liquid crystal layer 7 at its initial state (no voltage application) to a substantially vertical alignment. Alignment treatment (for example, rubbing processing) is performed to the respective alignment films 3, 6. The respective alignment films 3, 6 provide a pretilt angle to the liquid crystal molecules of the liquid crystal layer 7 in the vicinity of the interface of the liquid crystal layer 7. In this embodiment, a pretilt angle of approximately 89 degrees to 89.9 degrees is provided. The upper substrate 1 and the lower substrate 4 are positioned so that the alignment treatment direction (for example, the rubbing direction) of the respective alignment films 3, 6 becomes an anti-parallel condition. The liquid crystal layer 7 is thereby controlled to a substantially vertical alignment. Note that it is also possible to perform the alignment treatment to only one of the alignment films 3, 6.

The liquid crystal layer 7 is provided mutually between the respective upper electrode 2 of the upper substrate 1 and the lower electrode 5 of the lower substrate 4. In this embodiment, the liquid crystal layer 7 is configured by using a liquid crystal material (nematic liquid crystal material) in which the dielectric anisotropy delta epsilon is negative ($\Delta\epsilon<0$). Bold lines 11 illustrated in the liquid crystal layer 7 schematically show the orientation direction (director) of the liquid crystal molecules during voltage application. With the liquid crystal display of this embodiment, the oriented state of the liquid crystal molecules of the liquid crystal layer 7 is vertically oriented in the initial state (state of no voltage application), and the oriented state of the liquid crystal molecules changes so as to intersect with the electric field direction based on voltage application. Retardation of the liquid crystal layer 7 is approximately 300 nm.

The upper polarizer 8 is disposed on the outside of the upper substrate 1. Moreover, the lower polarizer 9 is disposed on the outside of the lower substrate 4. In this embodiment, the upper polarizer 8 and the lower polarizer 9 are disposed in crossed nicols. Moreover, the upper polarizer 8 and the lower polarizer 9 are disposed so that their respective absorption axes form an angle of approximately 45 degrees relative to the orientation direction of the liquid crystal molecules in the vicinity of the center in the layer thickness direction of the liquid crystal layer 7 that is defined by the foregoing alignment treatment direction. Note that, as needed, an optical compensation plate may be disposed between the upper polarizer 8 and the upper substrate 1, and between the lower polarizer 9 and the lower substrate 4, respectively. The optical compensation plate may also be integrated with the respective polarizers.

The structure of the respective openings 12 provided to the upper electrode 2 is now explained with reference to the schematic plan view shown in FIG. 2. In FIG. 2, a part of the respective openings 12 when viewed from the side of the upper substrate 1 is shown as a plan view. In FIG. 2, S represents the length of the lateral direction (short-side length) of the respective openings 12, and W represents the edge interval of the openings 12 which are adjacent in the lateral direction, respectively. As shown in the diagram, the respective openings 12 are formed in a rectangular shape extending unidirectionally, and are aligned with regularity. Moreover, the respective openings 12 are disposed so that their longitudinal direction becomes substantially orthogonal to the foregoing alignment treatment direction of the respective alignment films 3, 6.

With the liquid crystal display of the embodiment shown in FIG. 2, the inside of the effective display area, which is an area where the upper electrode 2 and the lower electrode 5 overlap in a plan view, is divided into two types of areas (area 1, area 2). As shown in the diagram, the areas 1 and 2 are disposed alternately in two directions. Specifically, the respective areas 1, 2 are disposed in the illustrated checkerboard shape. The respective areas 1, 2 of this embodiment as shown in the diagram are set to a rectangular shape having a width Ph and a height Pv. Among the above, the openings 12 are not formed in the area 1, and a plurality of (in this example, five) openings 12 are respectively formed in the area 2. More specifically, the respective openings 12 are disposed so that their respective longitudinal directions are substantially parallel to the width direction of the area 2, and aligned along the height direction of the area 2. Note that, with the illustrated example, the length of the longitudinal direction of the respective openings 12 and the width Ph of the area 2 are set to be equal, but it is not limited thereto. The length of the longitudinal direction of the respective openings 12 may be set to be shorter than the width Ph of the area 2. The orientation direction of the liquid crystal molecules in the vicinity of the center in the layer thickness direction of the liquid crystal layer 7 during the voltage application to the area 1 is substantially orthogonal to the longitudinal direction of the respective openings 12 formed in the area 2.

FIG. 3 is a diagram showing an example of the setting values of the respective parameters such as the width Ph and the height Pv of the respective areas, and the short-side length S and the edge interval W of the respective openings 12. The unit of each of the setting value is millimeters (mm). In the ensuing explanation, for the sake of convenience, the case of setting Ph=0.05 mm, Pv=0.05 mm, S=0.007 mm, and W=0.014 mm is referred to as the "structure 1", the case of setting Ph=0.1 mm, Pv=0.1 mm, S=0.007 mm, and W=0.014 mm is referred to as the "structure 2", and the case of setting Ph=0.15 mm, Pv=0.15 mm, S=0.007 mm, and W=0.014 mm is referred to as the "structure 3".

Figure 4B:
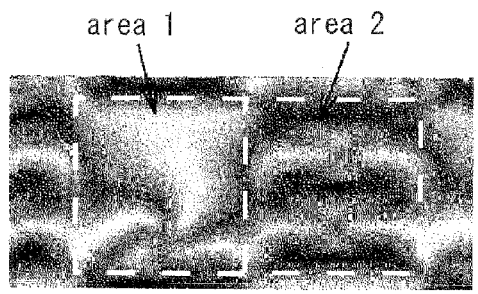
Figure 4C:
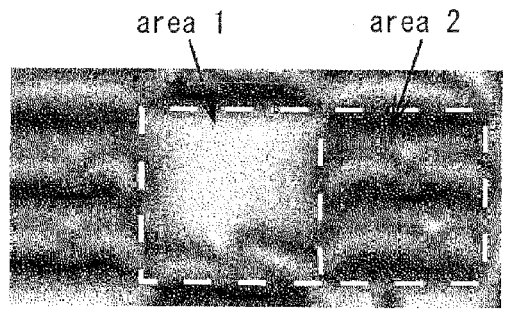

FIGS. 4A to 4C are diagrams showing the orientation texture observed image when the pretilt angle provided by the respective alignment films 3, 6 was set to approximately 89.9 degrees, approximately 89.7 degrees and approximately 89 degrees in the liquid crystal display of the foregoing structure 1. FIG. 4A is an observed image when the pretilt angle was set to approximately 89.9 degrees, FIG. 4B is an observed image when the pretilt angle was set to approximately 89.7 degrees, and FIG. 4C is an observed image when the pretilt angle was set to approximately 89 degrees. As shown in FIG. 4A, the respective orientation directions of the upper substrate 1 and the lower substrate 4 are of an anti-parallel condition, the respective absorption axes of the upper polarizer 8 and the lower polarizer 9 are of a crossed nicols state, and the respective orientation directions and the respective absorption axes form an angle of approximately 45 degrees (same applies to FIG. 4B and FIG. 4C).

As shown in FIGS. 4A to 4C, regardless of the value to which the pretilt angle is set, it can be seen that the orientation texture is different in the area 1 and the area 2. Foremost, a cross-shaped dark area was observed in the area 1, and a state where the position of its intersection changes according to the size of the pretilt angle can be observed. Specifically, it can be seen that the foregoing intersection occurs at a position that is closer to the boundary of the area 1 and the area 2 as the pretilt angle becomes smaller. A dark area was observed at the position corresponding to the respective openings 12 in the area 2, and a cross-shaped dark area was observed at the position corresponding to the space between the mutually adjacent openings 12. In addition, the tendency where the position of the intersection becomes biased toward the position corresponding to the long side of the one opening 12 as the pretilt angle becomes smaller was observed. A cross-shaped dark area was observed in all cases, and it is considered that this shows that the orientation direction in the liquid crystal layer was rotated 90 degrees with this dark area as the boundary. Specifically, even though the alignment treatment direction in the upper substrate 1 and the lower substrate 4 is set to anti-parallel, it is considered that liquid crystal orientation is controlled in a plurality of directions. In other words, this is considered to be multi-domain alignment. Nevertheless, since the position of intersection in the cross-shaped dark area is biased within the area 1 due to the difference in the setting of the pretilt angle, it is considered that the size (area) of the respective domains in the multi-domain alignment can be controlled based on the size of the pretilt angle. To begin with, this cross-shaped dark area is generated due to the existence of the respective openings 12.

The association of the oriented state in the liquid crystal layer in the vicinity of the respective openings during voltage application and the foregoing dark area is now explained with reference to FIG. 1. As shown in FIG. 1, a plurality of (in the drawing, two) openings 12 are provided to the upper electrode 2. When voltage is applied between the upper electrode 2 and the lower electrode 5, a fringe electric field as shown with the broken line 10 in the diagram is generated in the vicinity of these openings 12. The liquid crystal molecules at substantially the center in the layer thickness direction of the liquid crystal layer 7 are thereby inclined and oriented in a direction that is perpendicular to the fringe electric field. Meanwhile, since alignment treatment is performed to the film surface of the respective alignment films 3, 6 of the upper substrate 1 and the lower substrate 4, respectively, a uniform pretilt angle is formed at the interface of the respective alignment films 3, 6 and the liquid crystal layer 7. Thus, in the vicinity of the respective openings 12, an area in which the direction of tilt of the liquid crystal molecules defined by the fringe electric field and the direction of tilt of the liquid crystal molecules defined by the alignment treatment direction are different will, by necessity, occur at the side of one of the openings 12. This creates an area where the direction of orientation and tilt rotates 180 degrees. This boundary line is recognized as the dark area in the texture. Specifically, it is recognized as the boundary area during multi-domain alignment. As a result of using this multi-domain alignment, it is considered that the minimum transmissivity in the anti-viewing direction of the liquid crystal display can be increased. Note that this boundary area is dependent on the size of the pretilt angle, and it is considered that the fringe electric field in the vicinity of the edge of the respective openings 12 is less influential when the pretilt angle is set smaller. According to experiments, it has been confirmed that multi-domain alignment can be realized if the pretilt angle is set to be greater than 88 degrees. Meanwhile, particularly in the area 1, it is considered that the effective aperture ratio can be increased by positioning the intersection of the cross-shaped dark area closer to the end of the area 1.

Figures 5, 6:
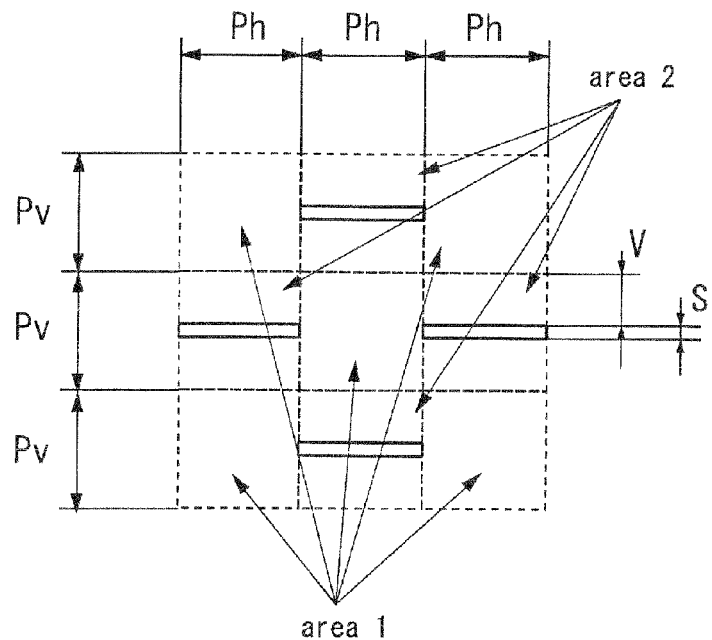
FIG. 5 is a diagram showing the actual measured values of the transmissivity during frontal viewing, maximum transmissivity of the optimal viewing direction, and minimum transmissivity of the anti-viewing direction during bright display state in the liquid crystal display having the setting values of the respective structures 1 to 3 and the respective pretilt angles.
FIG. 6 is a schematic plan view of a case of providing one opening in each area 2.

FIG. 5 is a diagram showing the actual measured values of the transmissivity during frontal viewing, maximum transmissivity of the optimal viewing direction, and minimum transmissivity of the anti-viewing direction during bright display state in the liquid crystal display having the setting values of the respective structures 1 to 3 and the respective pretilt angles. In the liquid crystal display, regardless of the condition, the minimum transmissivity in the anti-viewing direction was 1% or less, and it can be seen that the transmissivity increased considerably in comparison to a liquid crystal display of a conventional structure. The liquid crystal display of a conventional structure referred to above is a liquid crystal display that is configured the same as the liquid crystal display of the foregoing embodiment other than that the foregoing areas 1, 2 are not provided and the openings 12 are not provided. In the structure 1, it was confirmed that the minimum transmissivity in the anti-viewing direction drops as the pretilt angle is reduced, and that the transmissivity during frontal viewing and the maximum transmissivity of the optimal viewing direction can be increased. As we focus on the differences in the respective structures when the pretilt angle is set to approximately 89 degrees, the maximum transmissivity during frontal viewing and in the optimal viewing orientation tends to increase and the minimum transmissivity in the anti-viewing direction tends to decrease as the area of the area 1 becomes larger. With appearance observation, differences in the uniformity of display when viewed from the anti-viewing direction were observed due to the setting value of the pretilt angle. The uniformity of display was favorable when the pretilt angle was set to 89.5 degrees or less.

Note that, in order to further increase the transmissivity during frontal viewing in the liquid crystal display of the respective structures 1 to 3, increasing the ratio of the area of the respective areas 1 is considered to be effective. Specifically, the width Ph and the height Pv of the respective areas 1 and 2 can be set to be different values. Moreover, reducing the short-side length S and increasing the edge interval W of the respective openings 12 disposed in the area 2 are also considered to be effective. Thus, a case of disposing fewer openings 12 in the area 2 was also considered.

FIG. 6 is a schematic plan view of a case of providing one opening in each area 2. Even in the liquid crystal display of the embodiment shown in FIG. 6, the respective areas 1, 2 are disposed alternately in two directions. Specifically, the respective areas 1, 2 are disposed in the illustrated checkerboard shape, and, among the above, an opening 12 is not disposed in the area 1, and one opening 12 is disposed in each area 2. Specifically, the respective openings 12 are disposed so that their respective longitudinal directions are substantially parallel to the width direction of the area 2, and aligned along the height direction of the area 2.

Figures 7, 8, 9:
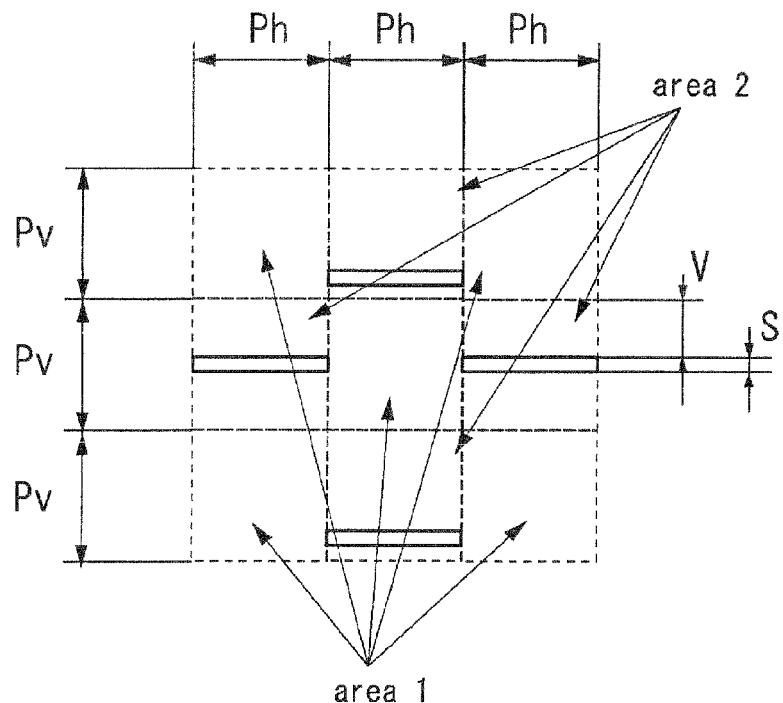
FIG. 7 is a diagram showing an example of the setting values of the respective parameters in cases of providing one opening to each area 2.
FIG. 8 is a diagram showing the actual measured values of the transmissivity during frontal viewing, maximum transmissivity of the optimal viewing direction, and minimum transmissivity of the anti-viewing direction during bright display state in the liquid crystal display of the respective structures 4 to 6.
FIG. 9 is a schematic plan view of a case of providing one opening in each area 2.

FIG. 7 is a diagram showing an example of the setting values of the respective parameters in cases of providing one opening to each area 2. The unit of each of the setting value is millimeters (mm). Note that parameter V is the distance between the long-side edge and end of the area 2 of the respective openings 12. In the ensuing explanation, for the sake of convenience, the case of setting Ph=0.08 mm, Pv=0.057 mm, S=0.007 mm, and V=0.0285 mm is referred to as the "structure 4", the case of setting Ph=0.08 mm, Pv=0.107 mm, S=0.007 mm, and V=0.0536 mm is referred to as the "structure 5", and the case of setting Ph=0.08 mm, Pv=0.157 mm, S=0.007 mm, V=0.0785 mm is referred to as the "structure 6". The conditions other than the various conditions specified above are common with the liquid crystal display of the foregoing embodiment. Note that the pretilt angle in the liquid crystal display of all structures 4 to 6 was set to approximately 89 degrees.

FIG. 8 is a diagram showing the actual measured values of the transmissivity during frontal viewing, maximum transmissivity of the optimal viewing direction, and minimum transmissivity of the anti-viewing direction during bright display state in the liquid crystal display of the respective structures 4 to 6. It was observed that the transmissivity during frontal viewing tends to increase considerably as the Pv increases; that is, as the electrode aperture ratio increases, and with the liquid crystal display of the structure 6 with the highest electrode aperture ratio, it was confirmed that it was possible to inhibit this to the transmissivity deterioration of approximately 10% in comparison to the liquid crystal display of the conventional structure described above. Meanwhile, it was observed that the minimum transmissivity in the anti-viewing direction tends to increase as the electrode aperture ratio decreases. However, the minimum transmissivity was 0.3% or more under all conditions, and it was confirmed that the structure 5 can achieve 0.5%, and the structure 4 can achieve 1% or higher. In the case of FIG. 5 described above; that is, in comparison to the case of more openings 12 being provided to the area 2, although the ratio of the transmissivity during frontal viewing and the minimum transmissivity in the anti-viewing direction is considerably different, from the observation of appearance, 0.3% or more and preferably 0.5% or more in which the bright display state is visible have been realized. And, based on the actual external observation, it has been confirmed that the visibility during the bright display state in the anti-viewing direction improved in comparison to the liquid crystal display of a conventional structure in all liquid crystal displays of the structures 4 to 6.

Note that, in the liquid crystal display of the embodiment shown in FIG. 6, although the distance V between the long-side edge of the respective openings 12 and the end of the area 2 was set to the same value regarding each of the openings 12 that was provided to each area 2, this parameter V may be set to a different value for each opening 12. An example of this is shown in FIG. 9. In the liquid crystal display illustrated in FIG. 9, among the respective areas 2, the value of the parameter V in the respective openings 12 of the area 2 positioned at the upper side and lower side in the diagram, and the value of the parameter V in the respective openings 12 of the area 2 positioned on the right side and left side in the diagram are mutually different. Note that this is merely an example, and the value of the parameter V in the openings 12 disposed in each area 2 can be set arbitrarily.

Figure 10:
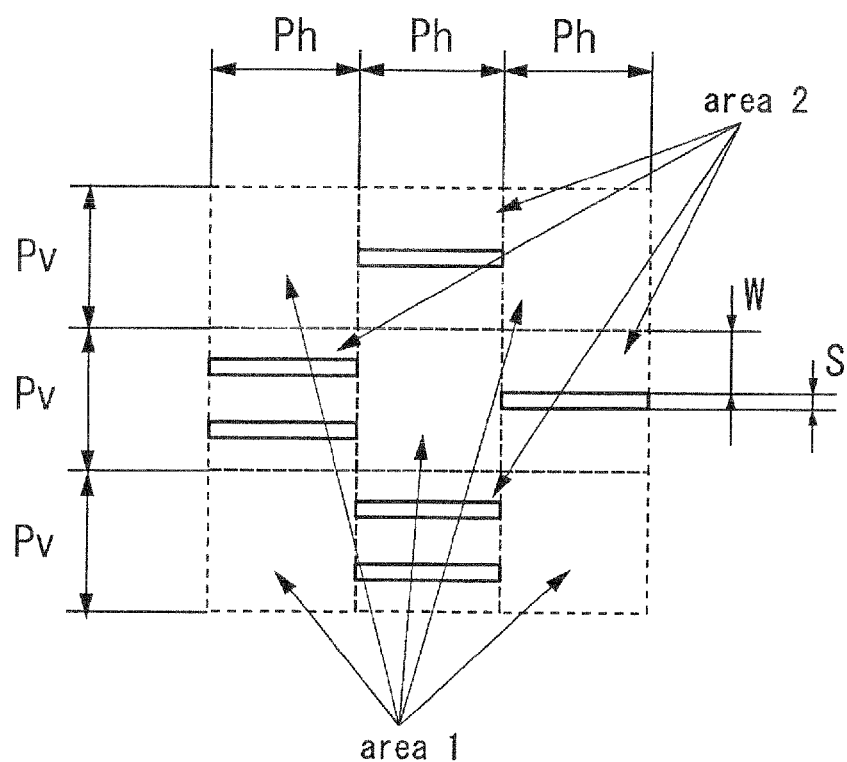
FIG. 10 is a schematic plan view of a case of disposing different number of openings in each area 2.

Moreover, although the same number of openings 12 were provided to each area 2 with the liquid crystal display of the respective embodiments shown in FIG. 2 and FIG. 6, as shown in the example of FIG. 10, the number of openings 12 to be disposed in each area 2 may be set to be different. In the liquid crystal display illustrated in FIG. 10, among the respective areas 2, two openings 12 are provided to each area 2 positioned at the left side and lower side in the diagram, and one opening 12 is provided to each area 2 positioned at the right side and upper side in the diagram. Note that this is merely an example, and the number of openings 12 to be disposed in each area 2 can be set arbitrarily. Moreover, all openings 12 were of the same shape in the liquid crystal display of the respective embodiments shown in FIG. 2, FIG. 6, and FIG. 10, but it is not limited thereto. In the liquid crystal display of the embodiment shown in FIG. 2, although the plurality of openings 12 disposed in each area 2 were arranged periodically along their respective lateral directions, the respective openings 12 may also be disposed non-periodically. In the liquid crystal display of the embodiment shown in FIG. 6, the one opening 12 in each area 2 was disposed at the approximate center relative to the width direction and height direction of the respective areas, but it is not limited thereto.

According to the liquid crystal display of the foregoing embodiments, it is possible to increase the minimum transmissivity in the anti-viewing direction, and improve the viewing angle characteristics during the bright display state in the anti-viewing direction. Accordingly, the display state can now be recognized even in an orientation where the display visibility was inferior in the conventional display, and the display quality of the liquid crystal display can thereby be improved.

Note that this invention is not limited to the subject matter of the foregoing embodiments, and can be implemented by being variously modified within the scope of the gist of the present invention. For example, although the respective areas 1, 2 were set to a rectangular shape in the foregoing embodiment, the shape of the respective areas is not limited thereto.

What is claimed is:

1. A liquid crystal display, comprising:
   a first substrate which includes a first electrode on a first plane thereof;
   a second substrate which includes a second electrode on a first plane thereof; and
   a liquid crystal layer which is provided between the first substrate and the second substrate and which is controlled to a substantially vertical orientation so that liquid crystal molecules of the liquid crystal layer have a pretilt angle that is smaller than 90 degrees,
   wherein when viewed in a top planar direction, the first electrode includes a plurality of rectangular openings extending in a longitudinal direction that is substantially perpendicular to an orientation direction that is a direction of an azimuth defined by the pretilt angle of the liquid crystal molecules of the liquid crystal layer, the direction of the azimuth being parallel to the first electrode,
   wherein when viewed in the top planar direction, the first electrode includes a plurality of first areas and a plurality of second areas disposed mutually alternately in both: (i) the longitudinal direction of said plurality of rectangular openings, and (ii) the orientation direction of the liquid crystal molecules in the direction of the azimuth which is substantially perpendicular to the longitudinal direction, such that the plurality of first areas and the plurality of second areas are disposed in a checkerboard shape, wherein an area of each of the plurality of first areas is substantially the same as an area of each of the plurality of second areas, and wherein the plurality of first and second areas are set in a single continuous effective display area in which the first electrode and the second electrode overlap when viewed in the top planar direction, and
   wherein the openings are not formed in the plurality of first areas.

2. The liquid crystal display according to claim 1, wherein two or more of the openings are formed in each of the plurality of second areas.

3. The liquid crystal display according to claim 1, wherein the pretilt angle is 89.5 degrees or less and 88 degrees or more.

4. The liquid crystal display according to claim 1, further comprising:
   a first polarizer which is disposed on a second plane of the first substrate which is opposite to the first plane of the first substrate; and
   a second polarizer which is disposed on a second plane of the second substrate which is opposite to the first plane of the second substrate,
   wherein the first polarizer and the second polarizer are disposed so that their respective absorption axes become substantially orthogonal to each other, and
   wherein each of said absorption axes and the orientation direction of the liquid crystal molecules of the liquid crystal layer in the direction of the azimuth forms an angle of approximately 45 degrees.

5. The liquid crystal display according to claim 1, wherein a relative position of a first one of the openings formed in a first one of the plurality of second areas is different from a relative position of a second one of the openings which corresponds to the first one of the openings and which is formed in a second one of the plurality of second areas.

6. The liquid crystal display according to claim 1, wherein a number of the openings formed in each of the plurality of second areas is not the same.

7. The liquid crystal display according to claim 1, wherein a respective outer perimeter of each of the plurality of first areas and each the plurality of second areas completely overlaps a long side or a short side of at least one of the rectangular openings.

8. The liquid crystal display according to claim 1, wherein when viewed in the top planar direction:
   each of the plurality of first areas and each of the plurality of second areas has a square shape and has at least one side that completely overlaps a short side of a plurality of the rectangular openings;
   at least one side of each of the plurality of first areas completely overlaps and coincides with a long side of one of the rectangular openings; and
   a length of the long side of each of the rectangular openings is equal to a length of each of the four sides of each of the plurality of first and second areas.

9. A liquid crystal display, comprising:
   a first substrate which includes a first electrode on a first plane thereof;
   a second substrate which includes a second electrode on a first plane thereof; and
   a liquid crystal layer which is provided between the first substrate and the second substrate and which is controlled to a substantially vertical orientation so that liquid crystal molecules of the liquid crystal layer have a pretilt angle that is 89.5 degrees or less and 88 degrees or more,
   wherein when viewed in a top planar direction, the first electrode includes a plurality of rectangular openings extending in a longitudinal direction that is substantially perpendicular to an orientation direction that is a direction of an azimuth defined by the pretilt angle of the liquid crystal molecules of the liquid crystal layer, the direction of the azimuth being parallel to the first electrode,
   wherein when viewed in the to planar direction, the first electrode includes a plurality of first areas and a plurality of second areas disposed mutually alternately in both: (i) the longitudinal direction of said plurality of rectangular openings, and (ii) the orientation direction of the liquid crystal molecules in the direction of the azimuth which is substantially perpendicular to the longitudinal direction, such that the plurality of first areas and the plurality of second areas are disposed in a checkerboard shape, wherein an area of each of the plurality of first areas is substantially the same as an area of each of the plurality of second areas, and wherein the plurality of first and second areas are set in a single continuous effective display area in which the first electrode and the second electrode overlap when viewed in the top planar direction,
   wherein the openings are not formed in the plurality of first areas, and
   wherein two or more of the openings are formed in each of the plurality of second areas.

10. The liquid crystal display according to claim 9, further comprising:
    a first polarizer which is disposed on a second plane of the first substrate which is opposite to the first plane of the first substrate; and
    a second polarizer which is disposed on a second plane of the second substrate which is opposite to the first plane of the second substrate,
    wherein the first polarizer and the second polarizer are disposed so that their respective absorption axes become substantially orthogonal to each other, and wherein each of said absorption axes and the orientation direction of the liquid crystal molecules of the liquid crystal layer in the direction of the azimuth forms an angle of approximately 45 degrees.

11. The liquid crystal display according to claim 9, wherein a respective outer perimeter of each of the plurality of first areas and each the plurality of second areas completely overlaps a long side or a short side of at least one of the rectangular openings.

12. The liquid crystal display according to claim 9, wherein when viewed in the top planar direction:
each of the plurality of first areas and each of the plurality of second areas has a square shape and has at least one side that completely overlaps a short side of a plurality of the rectangular openings;
at least one side of each of the plurality of first areas completely overlaps and coincides with a long side of one of the rectangular openings; and
a length of the long side of each of the rectangular openings is equal to a length of each of the four sides of each of the plurality of first and second areas.

13. A liquid crystal display, comprising:
a first substrate which includes a first electrode on a first plane thereof;
a first polarizer which is disposed on a second plane of the first substrate which is opposite to the first plane of the first substrate;
a second substrate which includes a second electrode on a first plane thereof;
a second polarizer which is disposed on a second plane of the second substrate which is opposite to the first plane of the second substrate; and
a liquid crystal layer which is provided between the first substrate and the second substrate and which is controlled to a substantially vertical orientation so that liquid crystal molecules of the liquid crystal layer have a pretilt angle that is smaller than 90 degrees,
wherein the first polarizer and the second polarizer are disposed so that their respective absorption axes become substantially orthogonal to each other,
wherein when viewed in a top planar direction, the first electrode includes a plurality of rectangular openings extending in a longitudinal direction that is substantially perpendicular to an orientation direction that is a direction of an azimuth defined by the pretilt angle of the liquid crystal molecules of the liquid crystal layer, the direction of the azimuth being parallel to the first electrode,
wherein when viewed in the to planar direction, the first electrode includes a plurality of first areas and a plurality of second areas disposed mutually alternately in both: (i) the longitudinal direction of said plurality of rectangular openings, and (ii) the orientation direction of the liquid crystal molecules in the direction of the azimuth which is substantially perpendicular to the longitudinal direction, such that the plurality of first areas and the plurality of second areas are disposed in a checkerboard shape, wherein an area of each of the plurality of first areas is substantially the same as an area of each of the plurality of second areas, and wherein the plurality of first and second areas are set in a single continuous effective display area in which the first electrode and the second electrode overlap when viewed in the top planar direction,
wherein each of said absorption axes and the orientation direction of the liquid crystal molecules of the liquid crystal layer in the direction of the azimuth forms an angle of approximately 45 degrees,
wherein the openings are not formed in the plurality of first areas, and
wherein two or more of the openings are formed in each of the plurality of second areas.

14. The liquid crystal display according to claim 13, wherein a respective outer perimeter of each of the plurality of first areas and each the plurality of second areas completely overlaps a long side or a short side of at least one of the rectangular openings.

15. The liquid crystal display according to claim 13, wherein when viewed in the top planar direction:
each of the plurality of first areas and each of the plurality of second areas has a square shape and has at least one side that completely overlaps a short side of a plurality of the rectangular openings;
at least one side of each of the plurality of first areas completely overlaps and coincides with a long side of one of the rectangular openings; and
a length of the long side of each of the rectangular openings is equal to a length of each of the four sides of each of the plurality of first and second areas.

* * * * *